No. 759,044. PATENTED MAY 3, 1904.
F. W. TAYLOR.
RELIEVING GEAR FOR PORTABLE WEIGHING SCALES.
APPLICATION FILED JAN. 4, 1904.
NO MODEL.
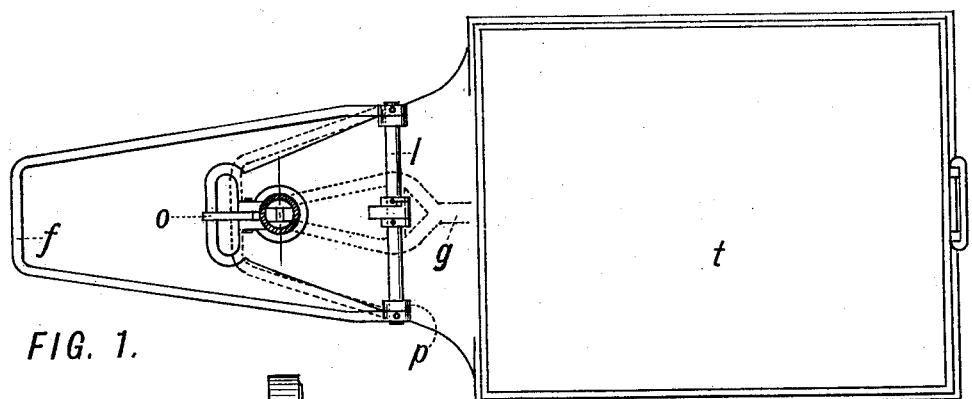
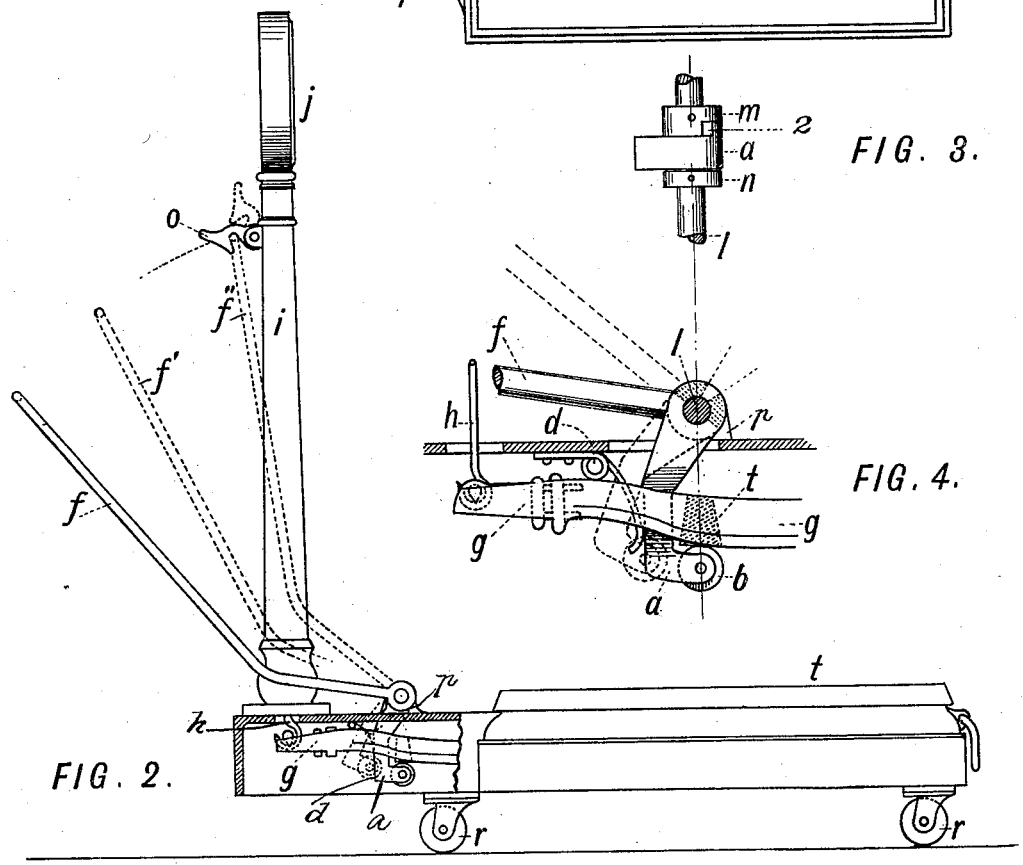

No. 759,044.                                    Patented May 3, 1904.

UNITED STATES PATENT OFFICE.

FREDERICK W. TAYLOR, OF ST. JOHNSBURY, VERMONT, ASSIGNOR TO
E. & T. FAIRBANKS & COMPANY, OF ST. JOHNSBURY, VERMONT, A
CORPORATION OF VERMONT.

RELIEVING-GEAR FOR PORTABLE WEIGHING-SCALES.

SPECIFICATION forming part of Letters Patent No. 759,044, dated May 3, 1904.

Application filed January 4, 1904.  Serial No. 187,677.  (No model.)

*To all whom it may concern:*

Be it known that I, FREDERICK W. TAYLOR, a citizen of the United States, residing at St. Johnsbury, in the county of Caledonia, State of Vermont, have invented certain new and useful Improvements in Relieving-Gear for Portable Weighing-Scales, of which the following is a description, reference being had to the accompanying drawings and to the letters and figures of reference marked thereon.

My invention relates to an improvement in weighing-scales, and particularly to the relieving-gear for portable platform-scales.

The object of the invention is to provide an arrangement for removing the weight of the levers from the steelyard-rod while the scale is being moved about and to have the relieving-gear controlled by the handle or bail by which the scale is drawn from place to place, so that when said bail or handle is grasped by the operator to move the scale to a different position the relieving-gear will be applied, while when it is desired to put the scale into use the moving of the bail or handle into inoperative position will unlock the relieving-gear and put the strain of the levers on the steelyard-rod.

While, therefore, the invention consists, as to one of its features, in the utilization of the scale-drawing bail or handle as a means for manipulating the locking-lever, so far as other features are concerned they may be applicable to other relieving-gear devices.

The invention is illustrated in the accompanying drawings, in which—

Figure 1 is a top plan view of a portable scale embodying my invention. Fig. 2 is a side elevation of the same, partly in section. Fig. 3 is a detail view of the clutch connection between the locking-lever and the shaft-collar; and Fig. 4 is a detail side elevation, partly in section, of the lower left-hand portion of the scale shown in Fig. 2.

In the drawings, $t$ represents the platform of an ordinary portable scale supported on the wheels $r$ and having the usual standard $i$, dial-frame $j$, steelyard-rod $h$, and lever $g$, the weight of the lever $g$ being taken off the steelyard-rod by manipulation of the locking-lever $a$, which is substantially like that illustrated in the patent granted P. F. Hazen, April 30, 1901, No. 673,261. A spring $d$, fastened to the under side of the scale-frame, bears against the back of the locking-lever $a$ and normally operates to force the locking-lever underneath the scale-lever.

The locking-lever $a$ at its upper end is mounted on the shaft 1, supported in bearings in lugs or ears $p$ on the neck of the scale-frame. Preferably this lever is loosely sleeved on said shaft and has a projection 2 and is held in place longitudinally on the shaft by the collar $n$, the projection 2 being adapted in the rotation of the shaft to be engaged by a corresponding projection on the clutch-collar $m$, and when this engagement takes place the movement of the shaft will move the locking-lever. The shaft is manipulated by the bail or handle $f$, which is rigidly connected to the shaft and by which the scale may be drawn from place to place.

When the bail is used for drawing the scale from place to place, it is in the position shown in full lines in Figs. 2 and 4, and the clutch on the locking-lever is separated from the clutch member $m$, and the levers are securely locked to prevent any vibration while the scale is being moved about. When it is desired to use the scale, the bail or handle is raised, and when it reaches the position shown in dotted lines $f'$ the clutch-collar $m$ engages the corresponding member on the locking-lever, and in the further movement of the shaft the locking-lever is swung out of engagement with the scale-lever, and the bail or handle may be locked by the catch $o$, and the scale may be used. When the bail or handle is released and dropped to normal position, the locking-lever passes under the scale-lever $g$ and puts the parts out of commission.

Various minor modifications and changes may be made without departing from the spirit of my invention.

Having thus described my invention, I declare that what I claim is—

1. In a relieving-gear for portable weighing-scales having the usual scale-lever and steelyard-rod, the combination with a handle or bail, for moving the same from place to place, and a lever for raising the scale-lever from the steelyard-rod, and connections between the two, whereby when the bail or handle is in position for use in moving the scale, the relieving-lever is in operative position and vice versa; substantially as described.

2. In a relieving-gear for weighing-scales having the usual scale-lever and steelyard-rod, a locking-lever for raising the scale-lever from the steelyard-rod, a shaft upon which said locking-lever is mounted, and a bail or handle, secured to said shaft, and adapted to operate it; substantially as described.

3. In a relieving-gear for weighing-scales, a locking-lever, a shaft upon which said locking-lever is loosely mounted, a bail or handle secured to said shaft, and a clutch member on said shaft, adapted to engage the locking-lever, and cause it to swing with said shaft; substantially as described.

4. In a relieving-gear for weighing-scales, the locking-lever, carrying one member of a clutching device, a shaft upon which said clutching-device member is loosely mounted, a clutch member coöperating therewith, fixed on said shaft, and a bail or handle for moving the scale, fixed to the said shaft; substantially as described.

In testimony whereof I affix my signature in presence of two witnesses.

FREDERICK W. TAYLOR.

Witnesses:
 FRANK H. TAYLOR,
 IDA L. BECK.